United States Patent [19]

Ramsay

[11] Patent Number: 5,166,725
[45] Date of Patent: Nov. 24, 1992

[54] PHOTOGRAMMETRIC METHOD AND APPARATUS

[76] Inventor: Morris Ramsay, 5 Woodland Ave., Greensburg, Pa. 15601

[21] Appl. No.: 740,982

[22] Filed: Aug. 6, 1991

[51] Int. Cl.$^5$ ............................................. G03B 27/68
[52] U.S. Cl. ........................................ 355/52; 355/45
[58] Field of Search ...................... 355/52, 45; 353/70; 359/446

[56] References Cited

U.S. PATENT DOCUMENTS 3,692,407 9/1972 Ramsay .................................. 355/52

Primary Examiner—Monroe H. Hayes
Attorney, Agent, or Firm—John M. Adams

[57] ABSTRACT

An image of an out-of-scale aerial survey photograph is projected onto a reflective surface of an unstretched, flexible mirror vertically positioned in a frame. The back of the mirror is connected to a plurality of control rods arranged in a coordinate system. The control rods are horizontally, movably supported on the frame so that the mirror is supported vertically free of tension. The mirror reflects the image onto a template having key points which also appear on the photograph. The control rods are selectively moved toward or away from the mirror to deform the mirror without inducing tension in the mirror so that adjacent areas of the mirror surface are not deformed as the reflected image is brought into register with the corresponding image on the template. Once an area of the mirror is deformed, the control rods are locked in position to prevent interaction by the deformation of other areas of the mirror. When the reflected image is in register with the template, the projection is stopped, an unexposed photographic film placed at the template location, and the projection resumed to produce an in-scale aerial photomap of the aerial survey photograph.

20 Claims, 11 Drawing Sheets

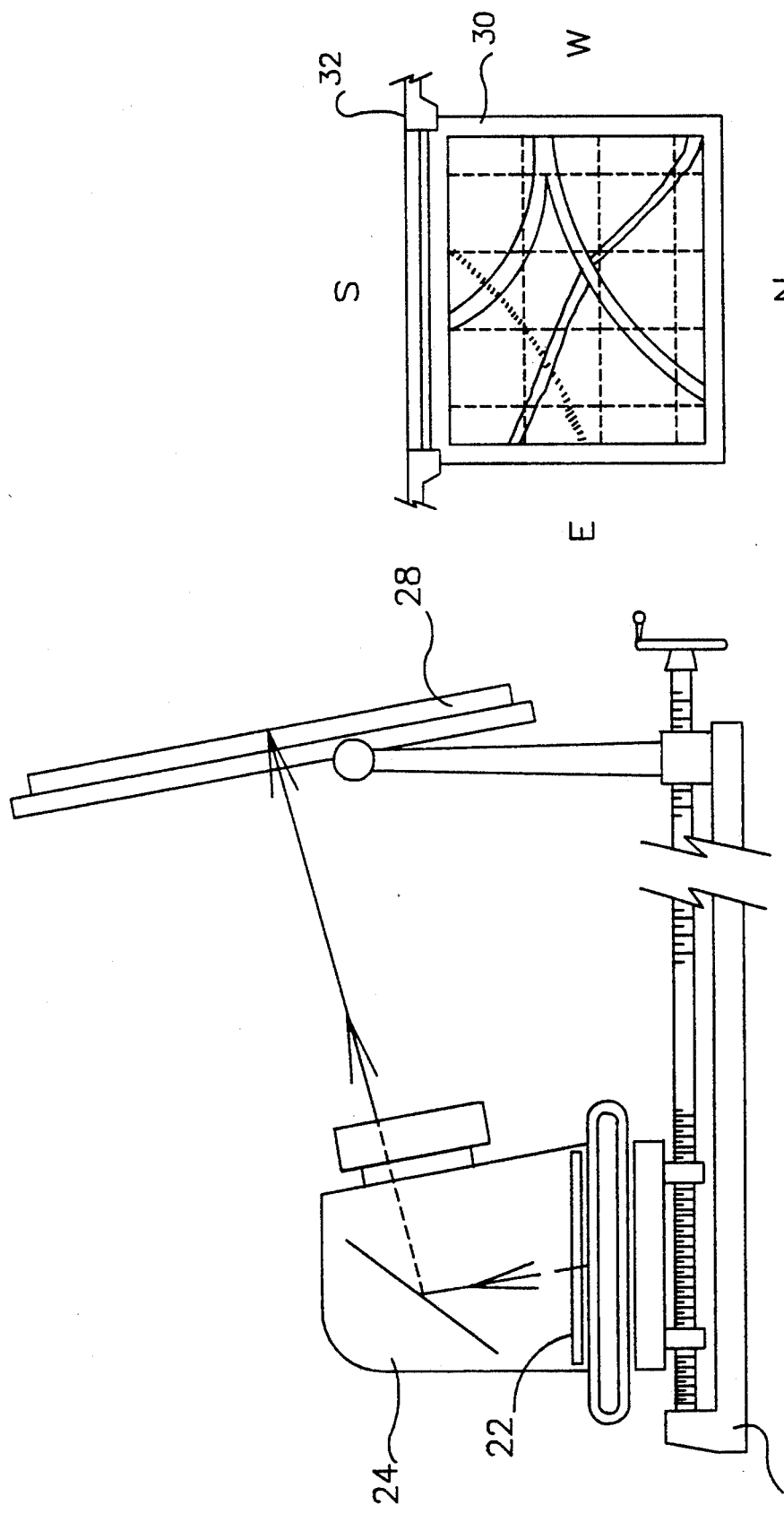

PHOTOGRAMMETRIC METHOD AND APPARATUS

BACKGROUND OF THE INVENTION

1. Field of the Invention

This invention relates to the preparation of aerial survey photomaps and more particularly to method and apparatus for making in-scale photographic maps.

2. Description of the Prior Art

Aerial photographs of geographic terrain are commonly used as maps and many applications are more useful than the known planimetric maps to record ground information, which must otherwise be obtained by conducting costly ground surveys and costly office drafting. The many details that are shown on an aerial photograph that may be converted to an in-scale photomap are obtained at a significantly less cost than that of conducting a ground survey. For these reasons, it is beneficial to use in-scale aerial photographs (photomaps) in the recording of utility lines and transmission lines.

In-scale aerial photomaps are commonly used by the U.S. Army Corp. of Engineers in the study of navigable rivers and particularly, photomaps of locks and dams and shore areas. Sanitary and water supply engineers utilize in-scale aerial photographic maps for systems studies, construction plans in land development studies and the recording of rights-of-way. Many commercial businesses utilize aerial photographs for recording data relevant to property holdings and property improvements.

An aerial photograph has the general appearance of a map, but the conditions that must exist to make a photograph an in-scale accurate photomap do not prevail. The only points that will be in their proper relative positions on an aerial photograph are the points on the datum plane, which is the horizontal plane selected as a reference level for computing the scale of the photograph. Objects that are higher than the datum plane and are not vertically beneath the camera will be located too far from the center of the resulting photograph and as a result, distortions of objects on the ground appear on the photograph. On the other hand, objects that are lower than the datum plane and are not vertically beneath the camera will be located too near the center of the resulting photograph. This characteristic of aerial photographs is called relief displacement or displacement of images because of relief.

If an object on the ground has appreciable height, an aerial photograph will show the image leaning away from the principal point of the photograph, unless the object happens to be vertically beneath the lens of the camera. Similarly, if a long, straight, structure such as a fence, extends over a hill its image on a aerial photograph will be bowed away from the principal point. If such a structure extends across a valley, then its image will be bowed toward the principal point. Other irregularities are caused by lens abberations, lens disturbances and appear in the form of barrel shaped distortion, a pin cushion shaped distortion, and a tangential shaped distortion. The airplane taking the photographs is rarely if ever exactly level. This further distorts the photograph into an oblong rather than circular shape.

Various known methods and apparatus have been proposed for preparing aerial photographic maps that eliminate distortion of images on that photograph due to relief displacement and other distortions.

U.S. Pat. No. 3,692,407 discloses a method and apparatus for making aerial survey and other photographs to scale. This is accomplished by first preparing a photographic reproduction by photographing an area and projecting the photograph against a reflecting surface. The image is reflected from the surface to an image surface. The reflecting surface is selectively deformed to eliminate distortions in the image of the photograph projected onto the image surface. The reflecting surface is a stretched, flexible and therefore, can be moved into a non-planar configuration. Control devices are individually manipulated to disturb the surface of the stretched reflecting mirror to change the position of the location of key points which are projected onto the image surface. The image surface includes an easel that holds photographic materials in overlying relationship. The easel supports a flat, resilient cushion which receives a rigid transparent member overlying the cushion. A sheet of glass holds one or more flat sheets in position on the easel.

Initially, a template of an area being mapped is prepared. The template includes principal or key points which are fixed by a field survey. An aerial photograph of the area corresponding to the area on the template is projected onto the template positioned on the easel. The reflective surface is selectively deformed to move the reflected image of the key point into register with the corresponding key point on the template. Thereafter, a photographic material is placed in the same plane as the template and is exposed to produce a photographic representation of the area which is suitably scaled.

Preparation of in-scale aerial photographs prepared by the above described method and apparatus have been found useful in mapping linear strip maps of pipe lines, sanitary sewers, water lines and the like. While the known device has been effective in producing in-scale aerial photographs of relatively confined linear strip areas, it is not operable for mapping of large geographical areas such as the mapping of statewide public utility service areas, cities and countries. By mounting a stretched flexible mirror for projecting the photographic image onto photographic material supported by an easel, the mirror is tension mounted. The mirror is sufficiently flexible to be warped/deformed by using controls at the edges that engage the mirror and, for example, move it forward to distort or warp the engaged area of the mirror.

The mirror is initially stretched and mounted in tension. However, when the controls are manipulated to selectively deform an area of a stretched mirror, additional tension is induced in the mirror. This results in a rippling action which propagates throughout the mirror. Thus other parts of the mirror interact with the area of the mirror being deformed. While one area of the stretched mirror is deformed to move a key feature of the reflected image into register with the template on the easel another reflected image is moved out of register with the template. Then efforts to counter distort a reflective image create more disturbances in other effected areas of the reflected image. With no tension reduction or outlet available in the stretched mirror efforts to correct initial settings merely repeats the disturbance of other areas of the mirror and the reflected image.

The use of a thin stretched mirror creates diffusion and concentration of image rays that create black holes and bright spots. Even with a thin stretched mirror it was found that when one key point of the reflected image is moved into register with corresponding a key point on the template a previous adjustment made in the location of another key point is disturbed. Consequently, repeated adjustments are required to restore previous settings. Also with a thin stretched mirror, if the controls are connected to the mirror surface, then imperfections, such as waves or blips, in the reflecting surface appear on the reflected image.

While the known device, using a stretched mirror under tension, for producing in-scale aerial photographs has been satisfactorily used for mapping relatively straight line, linear geographic areas, the known device is not satisfactory for mapping relatively large geographic areas due to the problems encountered in controlling deformation of the stretched mirror and with the interaction of deformations made over the surface of the stretched, tensioned mirror. This is particularly mainfest in deforming the tensioned mirror to execute one setting, resulting in a disturbance of a prior executed setting. Therefore, there is need for improved photogrammetric apparatus for making in-scale aerial photographs in which the problems encountered with a stretched, tensioned mirror are overcome. The tension in the stretched mirror must be reduced so that when one setting or deformation of the mirror is made subsequent settings or deformations are not disturbed. This interaction of mirror deformations requires repetitive mirror adjustments to bring and hold the reflected image into registry with the corresponding features on the template. Therefore, an improved photogrammetric device is needed to overcome the problem of interaction of mirror deformations, blips appearing on the reflective surface due to control connection with the mirror, and confining deformation of the reflected surface to selected areas to permit mapping of large geographic areas, as well as, linear areas.

SUMMARY OF THE INVENTION

In accordance with the present invention, there is provided apparatus for reflecting the image of an aerial survey photograph onto a template containing landmark features appearing on the aerial survey photograph that include a frame constructed of a pair of spaced apart upright members connected to a pair of cross-members to form an opening in the frame. A flexible planar sheet of material has a reflecting surface and an opposite surface. Means is provided for mounting the planar sheet free of tension to the frame within the frame opening. A plurality of control rods are supported by the frame in a preselected array to support and to move the tension free planar sheet. The control rods each have an end portion maintained in contact with the tension free planar sheet opposite surface for selectively deforming the reflecting surface upon movement of the control rod toward and away from the tension free planar sheet to place the reflective image of landmark features on the aerial survey photograph into register with the corresponding landmark features on the template. Means is provided for relieving and controlling induced tension added to the tension free planar sheet upon displacement of the reflective surface during movement of the control rods.

Further in accordance with the present invention, there is provided a method for reflecting the image of an aerial survey photograph onto a template having landmark features in correct relative locations thereon that include the steps of positioning a reflective mirror in the opening of a frame with the reflective surface of the mirror located to receive the projected image and reflect the image onto the template. The reflective mirror is flexibly connected to the frame to support the mirror free of tension and to allow a release of any tension applied to the reflective mirror. A selected point is displaced in the plane of the reflective mirror by moving the plane of the mirror toward or away from the template to bring a landmark feature of the image into register with the corresponding landmark feature on the template. The tension added to the plane of the reflected mirror upon displacement thereof is released from the mirror to maintain the mirror mounted in the frame free of tension and permit movement of the image of a selected landmark feature into register with the correct relative location of the landmark feature on the template while maintaining stationary, the position other reflective images on the template.

Additionally, the present invention is directed to a method for making in-scale aerial survey photographs of a geographic area that includes the steps of projecting an image of an out-of-scale aerial survey photograph of a geographic area onto a tension free reflective surface. A template containing key landmark features appearing on the aerial survey photograph at a given scale is mounted opposite the reflective surface. The image is reflected onto the template. A selected point in the plane of the reflective surface is displaced in a preselected direction toward or away from the template to bring a landmark feature of the image into register with the corresponding landmark feature on the template. The registered position of the displaced point in the plane of the reflective surface is fixed while making and fixing a plurality of successive displacements in the plane of the reflective surface to bring the remaining image of the landmark features into register with corresponding features on the template without displacing the prior register position. Thereafter, an unexposed photographic film is positioned at the location of the template. The projection of the registered image onto the film is resumed to expose the film. The exposed film is processed to produce an in-scale aerial survey photograph of the photographic area.

Accordingly, a principal object of the present invention is to provide apparatus for producing in-scale aerial photographs using a non-stretched, flexible reflective surface to remove distortions in the photographic image where the reflective surface is mounted free of unwanted tension so that the reflective surface remains flexible and tension is not induced in the reflective surface when it is deformed.

Another object of the present invention is to provide a photogrammetric device that includes a flexible, non-stretched mirror for reflecting a image onto a template where tension induced in the mirror upon distortion of the mirror is released from the mirror to eliminate the need for repeated adjustments of the mirror to maintain the reflected image in register with the template.

A further object of the present invention is to provide a flexible, deformable reflective mirror for use in preparing in-scale aerial photographs where selected areas or zones of the mirror are stabilized to prevent distortion of the reflective surface while adjacent areas of the mirror are deformed.

These and other objects of the present invention will be more be completely disclosed and described in the following specification, the accompanying drawings, and the appended claims.

BRIEF DESCRIPTION OF THE DRAWINGS

FIG. 3 is a schematic illustration of an opaque projector used to prepare the template from a conventional topographical map.

FIG. 4 is a schematic illustration of the tracing and reverse image projected on an image surface, illustrating the major landmarks selected from a topographical map.

DESCRIPTION OF THE PREFERRED EMBODIMENTS

Figure 1:
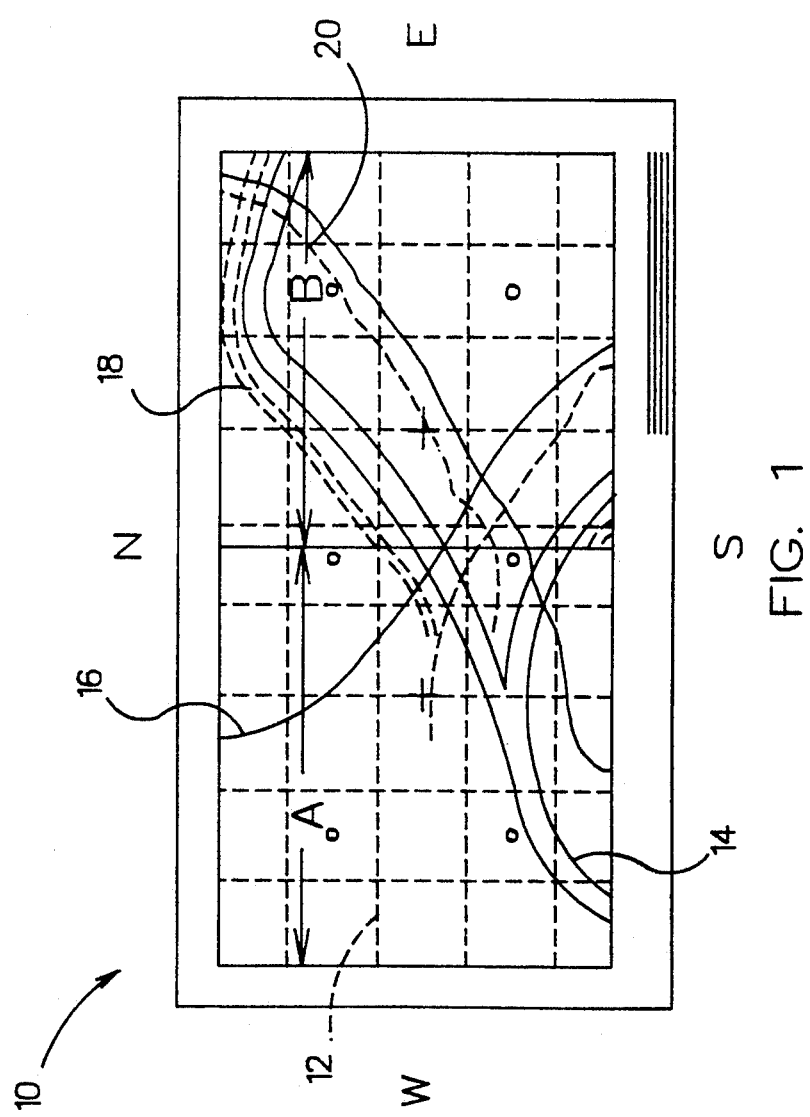
FIG. 1 is a schematic illustration of a finished product representing an in-scale photomap prepared in accordance with the present invention.

Referring to the drawings and particularly to FIG. 1, there is illustrated an in-scale aerial photomap generally designated by the numeral 10 prepared in accordance with the method and apparatus of the present invention. The aerial photomap is prepared on a geographic grid 12 having a preselected scale that may correspond to the scale of a related U.S. Geological Survey Quadrangle map. The selected scale may also be larger or smaller. The grid is representative of a desired geographical area that includes principal landmarks such as a paved road or highway 14, a stream or river 16, an unpaved road 18 and a trail 20. The photograph of the terrain including the above landmark features is prepared free of relief displacement and possesses the accuracy of a ground survey but with the detail that it is available with an aerial photograph.

The in-scale aerial photomap shown in FIG. 1 is initially prepared by reference to a template which corresponds to a map or the like prepared by ground survey techniques. Templates adaptable for use with the present invention may be obtained from a number of sources such as U.S. Geological Survey Quadrangle maps, recorded developments plans, construction plans, property survey maps, deed plots, maps, and the like. Anyone of these sources may be utilized to prepare a template for use with the present invention as long as they provide the desired degree of accuracy for the in-scale aerial photomap to be prepared. The template may represent a scale equal to, or larger, or smaller than the source control or map. This, along with device component moveability, gives the device the ability to produce in-scale photomaps at various scales and sizes.

Figure 2:
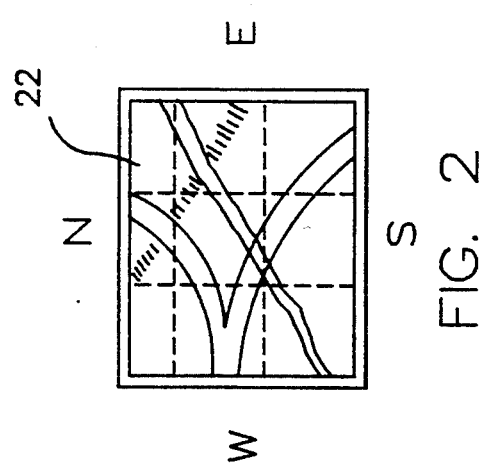
FIG. 2 is a schematic illustration of segment of a conventional topographical map from which a template of the area being mapped is prepared.

In most cases only a portion of an existing map is needed to prepare a template for use with the present invention. For example, FIG. 2 illustrates a portion of a map 22 which corresponds to the geographical area to be illustrated by the aerial photomap. Thus, only that portion of the map which corresponds to the aerial photomap to be prepared is selected for use in construction of a template. While the map itself may be used as a template, a template can be prepared from the map by use of an opaque projector 24, as illustrated in FIG. 3, where the final scale must vary from the source map scale, which is most often the case. If there is no scale variance from source map scale to product scale, then the source map itself can be directly used as the template, eliminating the opaque projector procedure. The projector 24 is conventional in design and is adjustably mounted on a base 26, to, where necessary, adjust the source map scale to the required production scale by forward or backward movement then reflect that enlarged or reduced image from the source map, such as map 22 shown in FIG. 2, positioned in the projector onto a surface for a tracing supported by an easel 28. The image from the projector 24 appears on the receiving surface as a reverse image. The image is traced onto the surface of template paper supported the easel 28. Only key landmark features need to be traced to serve as reference points.

FIG. 4 illustrates a tracing 30 constituting a template prepared by the projected image using the projector 24 shown in FIG. 3, or the source map itself, or a section thereof, if no scale change is required. The tracing 30 includes a reverse image of the landmark features taken from the map portion shown in FIG. 2. The tracing 30 then serves as a template which is suitably held in an easel 32 used in the present invention to receive the projected image of the aerial photograph which is to be brought in-scale as a photomap. The easel 32 is illustrated in greater detail in FIG. 5 and includes a supporting frame 34 on which the tracing or template 30 is retained. The frame 34 is supported by a base 36 that facilitates linear and angular adjustment of the frame 34 as well known in the art.

The easel 32 is mounted between a reflector apparatus generally designated by the numeral 38 and a projector generally designated by the numeral 40 suitable for use for projecting the image of an aerial survey photographic negative. The projector 40 is adjustably supported on a stand 41 movable vertically within itself and movable longitudinally toward and away from the projector apparatus 38 on rails 42. The base 36 of the easel 32 is also movably supported on the rails 42. Initially the aerial photographic survey negative is positioned in the projector 40 and the image is cast upon a flexible mirror 44 of the reflector apparatus 38. The image from the projector 40 is reflected by reflective surface 45 of the flexible mirror 44 onto the template 30 supported by easel 32. Initially the image of the key landmark features projected from the photograph in the projector 40, when reflected onto the template 30, do not register with the corresponding landmark features present on the template 30.

Therefore, in accordance with the present invention, the flexible mirror 44 is manipulated to bring the reflected image into register with the corresponding features on the template 30. It should be understood that the details of the projector 40 and the easel 32 are well known in the art and will not be described in detail herein. The specific structure of the easel 32 is disclosed in U.S. Pat. No. 3,692,407 issued to Morris Ramsay on Sep. 19, 1972, entitled "Method And Apparatus For Making Aerial Survey Photographs Scale", which patent is incorporated herein by reference.

Figure 5:
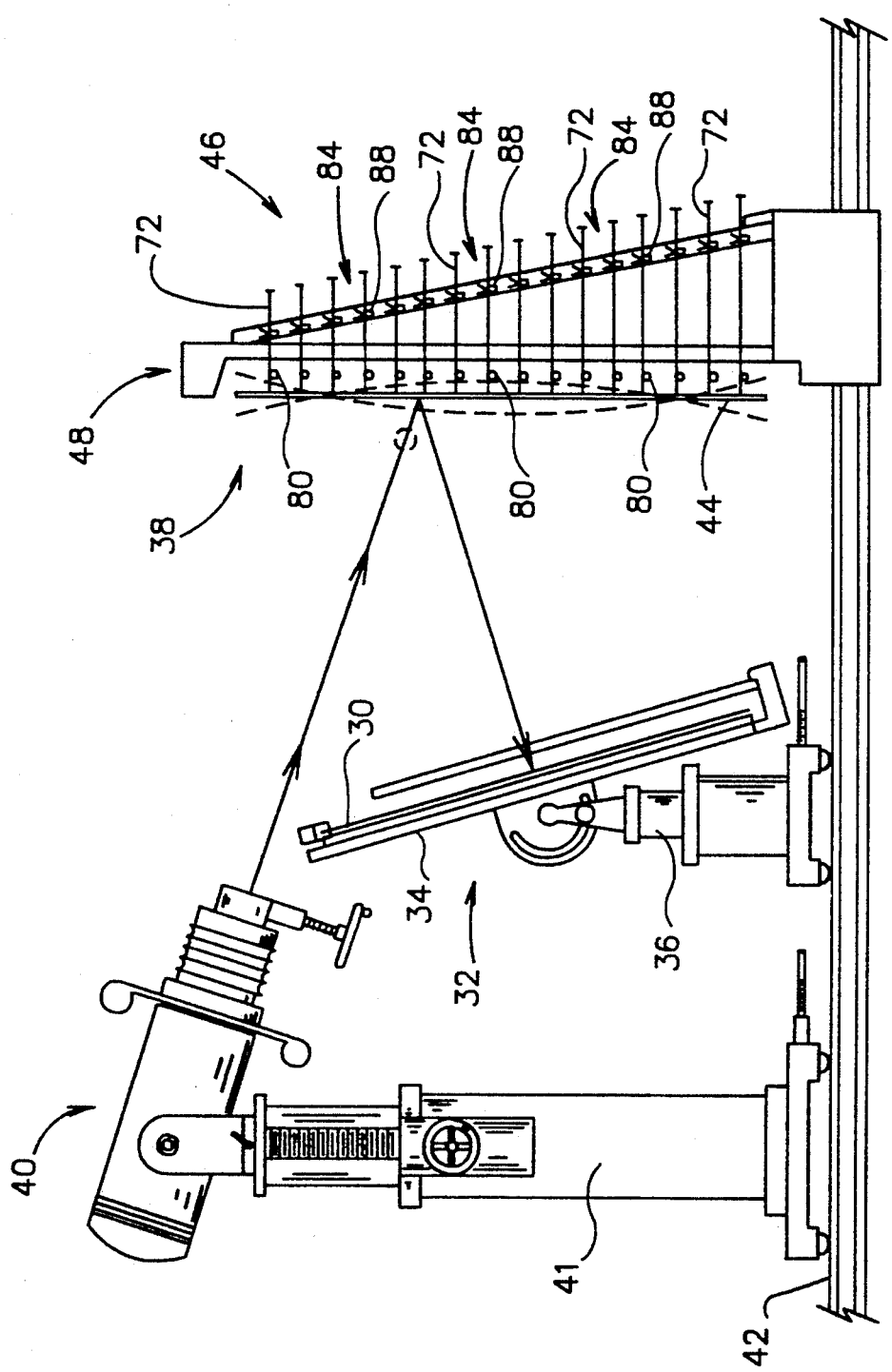
FIG. 5 is a schematic illustration of the apparatus of the present invention, including a projector, an improved reflecting surface, and easel whereby the filmed image is projected from the camera onto the reflecting surface and therefrom the image is placed in register with the template on the easel.
Figure 7:
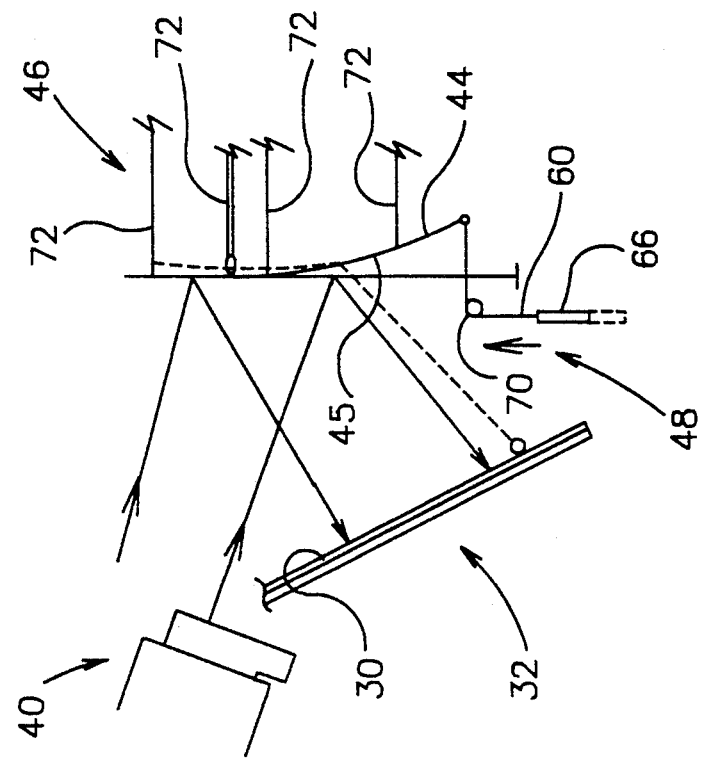
FIG. 7 is a view similar to FIG. 6, illustrating the operation of effecting counterdistortion by moving the mirror inwardly.
Figure 6:
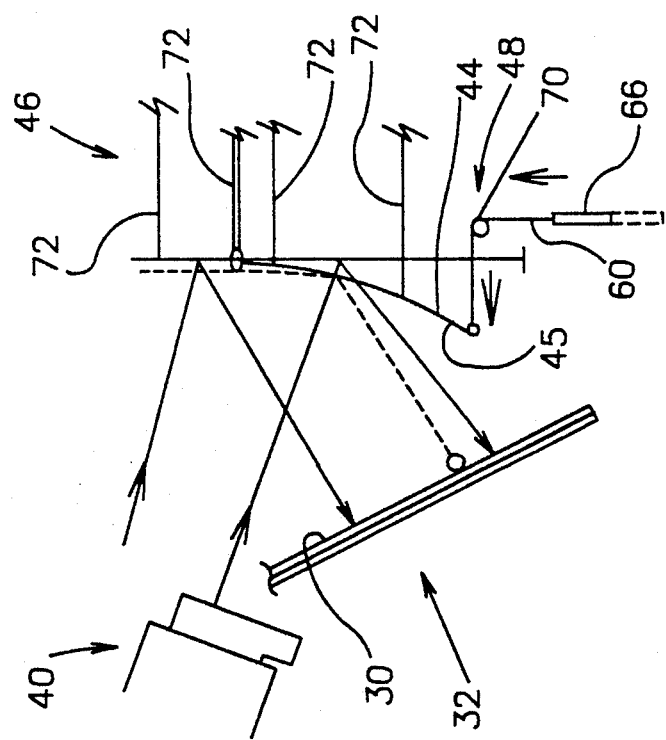
FIG. 6 is a schematic illustration of a step in the distorting of a mirror constituting the reflecting surface to effect the desired counterdistortion to bring the reflected image into register with the template on the easel.
Figure 9:
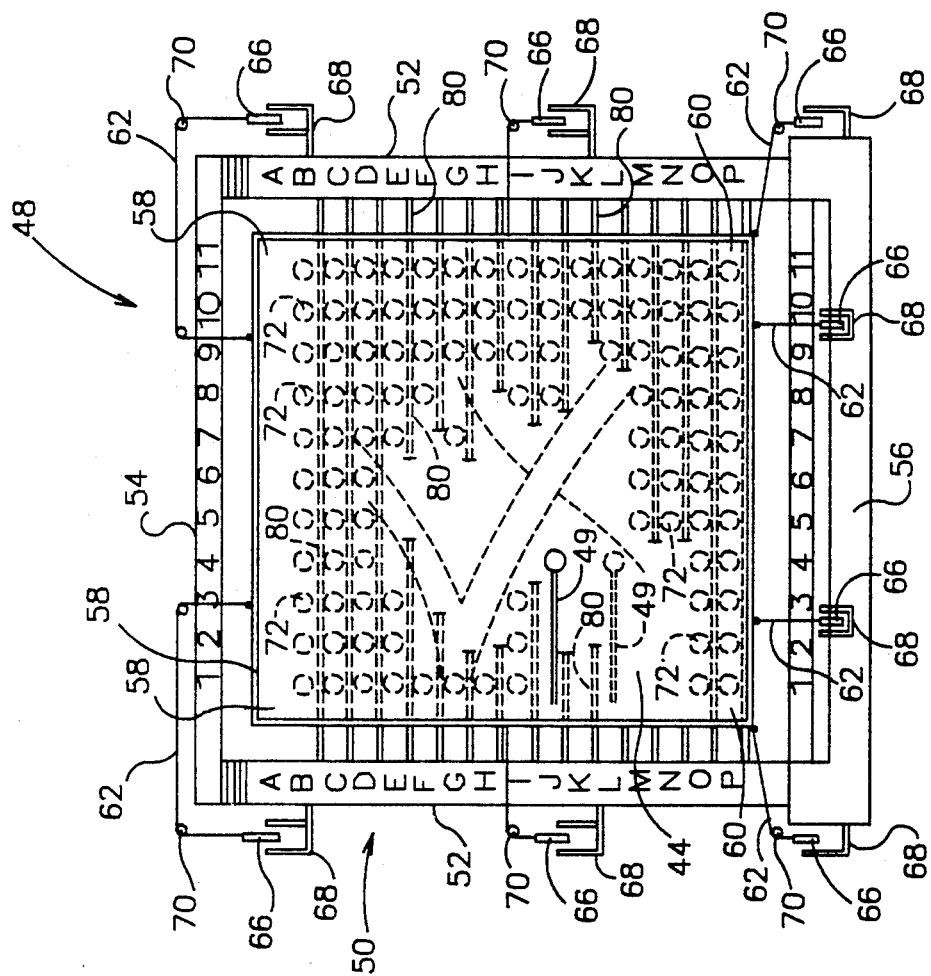
FIG. 9 is a front elevational view of the reflector apparatus, illustrating in phantom a control system attached to the rear of the reflector surface and a marker for locating the control to execute counterdistortion of the reflector surface.

The manipulation on the flexible mirror 44 on the reflector apparatus 38 is accomplished by a control mechanism generally designated by the numeral 46 in FIG. 5 and by mirror mounting apparatus generally designated by the numeral 48 in FIGS. 6 and 7 and illustrated in greater detail in FIG. 9. As disclosed in the above-identified patent the flexible mirror 44 is distorted to effect the desired counterdistortion required to bring the reflective image into register with the corresponding image on the template 30 supported by the easel 34.

As illustrated in FIGS. 6 and 7 the mirror 44 is flexible to allow it be moved toward or away from the easel 32. As shown in FIG. 5, the mirror 44 is supported by the control mechanism 46 which in turn is supported by the mounting apparatus 48, and the frame 50 shown in FIG. 9. By operation of the control mechanism 46, the surface of the mirror may then be diverted from its initial planar configuration. As shown in FIG. 6 the control mechanism 46 is manipulated to advance the lower portion of the mirror 44 toward the easel 32 which has the effect of displacing the reflected image from its initial reflected position on the template 30. In this manner, for example, the distorted image is moved into the register with the corresponding image on the template. The image can be moved in an opposite direction from that shown in FIG. 6 to the position shown in FIG. 7 where the lower portion of the mirror 44 is moved away from the easel 32. Thus, by coordinated displacement of the flexible mirror 44 on the mounting apparatus 48 the reflected image may be brought into register with the corresponding image on the template.

Figure 8:
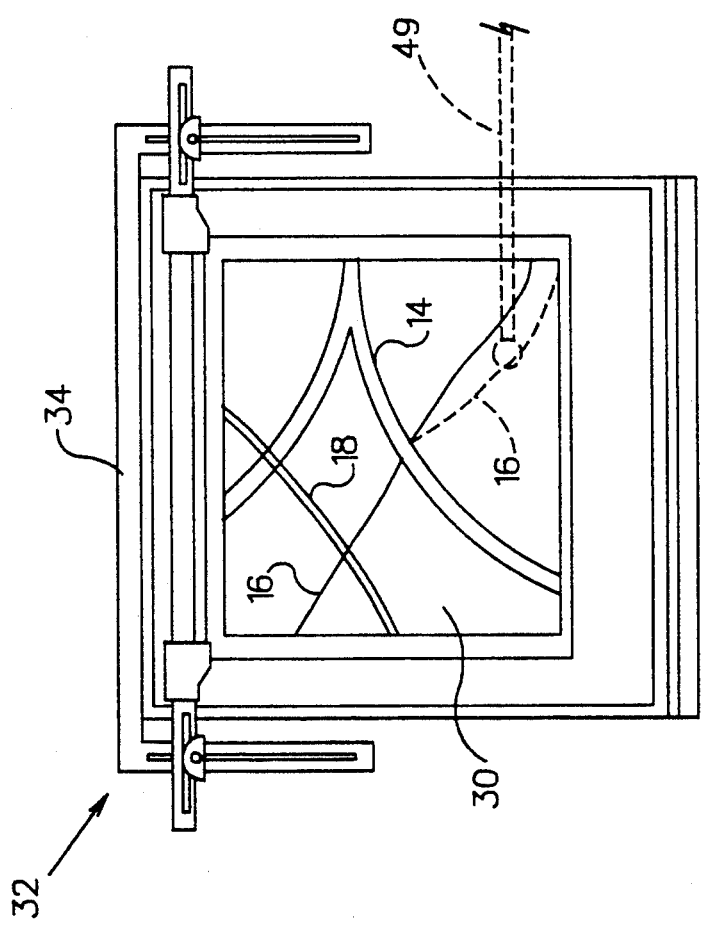
FIG. 8 is a front elevational view of the easel, illustrating distortion of a reflected image shown by dashed lines superimposed on the template.

Now referring to FIG. 8, there is illustrated a front view of the easel 32 having the template 30 secured by the frame 34 in position to receive the reflected image from the flexible mirror 44. The template 30 includes key landmark features 14, 16 and 18 as discussed above with regard to the map shown in FIG. 1 used to form the template 30. When the photographic image is projected onto the mirror 44 and reflected onto the template the reflected image of the corresponding landmark features are not in register with the features on the template 30. This is demonstrated, for example in FIG. 8, by the reflected image of a stream or river 16 identified by a hand-held wand 49 diverted from registry with the corresponding stream 16 of the template.

By operation of the mirror control mechanism 46 the reflected image of the stream 16 is brought into register with stream 16 on the template 30. This operation is repeated for the entire reflected image. However, it is a provision of the present invention to bring the reflected images into register with the corresponding features on the template and maintain register of those images while other portions of the reflected image are brought into register. Thus, the interaction of the register process does not disturb the overall counterdistortion of the reflected image. This is accomplished in accordance with the present invention by maintaining the flexible mirror 44 in a non-stretched condition free of induced tension while at the same time changing the relative position of the mirror to remove the distortion present in the reflected image.

Now referring to FIGS. 5 and 9, there is illustrated in detail the mirror mounting apparatus 48 for the reflector apparatus 38. In one example, the mirror 44 is fabricated on plastic and having on the surface thereof a vacuum deposited aluminum and silicon monoxide coating. A mirror suitable for use with the present invention is a commercially available optical plastic fabricated of rigid allyl diglycol carbonate. The material is flexible to allow deformation of the surface in accordance with the present invention and is scratch and chemical resistant.

The mirror 44 is surrounded by a frame generally designated by the numeral 50 having a pair of side members 52 connected to a top member 54 and a bottom member 56. The flexible, non-stretched mirror 44 is flexibly supported by the control mechanism 46 within the frame 50 and connected along upper edge 58 and lower edge 60 of the mirror 44 to a pair of pulley mounted cables 62 connected at opposite ends to weights 66 that overlie receptacles 68 attached to the frame 50. The cables 62 extend around pulleys 70 which are also suitably mounted in the frame 50. In this manner, the mirror 44 is only supported by the frame 50 so as to permit the mirror 44 to hang vertically within the frame 50. The mirror 44 is non-stretched in the frame 50; therefore, there is no tension induced in the mirror 44. Except for the tension created by the weight of the hanging mirror 44, the mirror 44 is free of tension. By eliminating a connection of the mirror 44 to the frame 50 which would otherwise stretch the mirror 44, the mirror 44 is not initially tensioned. Therefore, the problems heretobefore encountered in deforming a tensioned mirror are overcome with the present invention.

Preferably, at its upper and lower edges 58 and 60 the non-stretched mirror 44 is connected by the cables 62 to weights 66 so that the mirror 44 is maintained substantially in a vertical plane. The cables 62 are suitably supported by pulleys 70 that are also attached to the frame 50. By securing the weights 66 to the non-stretched mirror 44 the edges of the mirror 44 are kept from "hang curling". As the non-stretched and tension free mirror is deformed by moving it either toward or away from the template 30 on the easel 32 the weights 66 serve as edge flatners and move up or down in response to the movement of the mirror. In this manner, any tension in the mirror remains constant. Any tension in the non-stretched mirror is not increased when it is displaced from its initial planar position. Increases in the tension of a mirror would be encountered where the mirror is tightly secured around its entire periphery to the frame. In the present invention, the non-stretched mirror 44 is supported within the frame without adding or inducing tension on the mirror. Additionally, the relative movement of the weights 66 permits any tension induced in the mirror to be released when the non-stretched mirror is displaced. Thus, any induced mounting tensions or edge flattening or manipulation tensions are eliminated.

Figure 10:
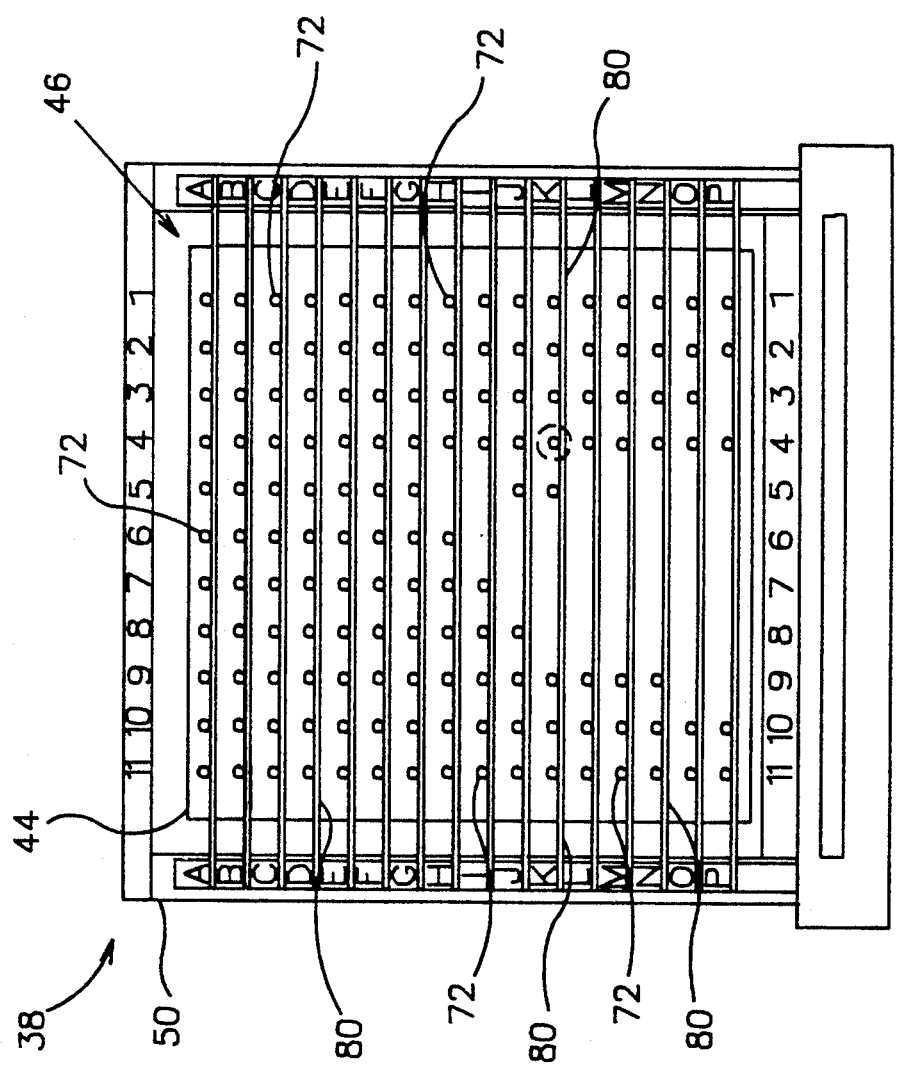
FIG. 10 is a rear elevational view of the reflector apparatus shown in FIGS. 5 and 9, illustrating the control system for effecting counterdistortion of the image projected on the template and also to support the mirror.
Figure 11:
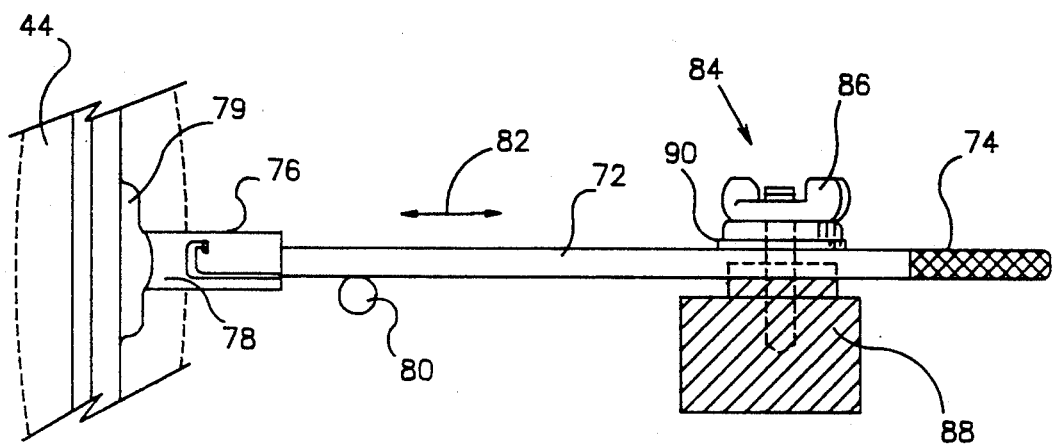
FIG. 11 is an enlarged view in side elevation of a control rod mounted at one end to a frame of the reflector apparatus and at the opposite end to the mirror, illustrating the connection of the control rod to the mirror.

Now referring to FIGS. 10 and 11 there is illustrated the control mechanism 46 which permits selective distortion of the mirror 44 to bring the reflected image into register with the images on the template 30. The control mechanism 46 is supported by the frame 50 and includes a plurality of control rods 72 having an operator end portion 74 and a connector end portion 76. The operator end portion 74 is in one embodiment manually controlled and the connector end portion 76 is secured to the rear surface of the flexible mirror 44. Preferably the control rod connector end portion 76 includes a removable portion 78 that is releasably connected at one end to the rod 72 and adhesively connected at the opposite end portion to the rear of the mirror 44. Preferably a foam-type adhesive 79, such as "Scotch" mounting tape, is used to secure the removable portion 78 to the mirror 44. The adhesive connection is accomplished without creating a surface imperfection in the mirror which would interfere with the projection of the image onto the template. As preferably seen in FIG. 10 the control rods are arranged in a preselected matrix or array in rows and columns where the rows are identified by letter desigations A-P, and the columns of control rods are identified by numbers 1-11. Thus, a preselected control rod is specifically identified as, for example, control rod K-4.

As discussed above the mirror 44 is hung from the frame 50 and thereby a degree of tension is imparted to the mirror due to the weight of the mirror. In order to relieve the mirror of tension induced in the mirror when deformed, i.e. displaced from its initial vertical planar position, the mirror is also supported by the control rods 72 which are connected to the mirror 44. The control rods 72 are movably positioned on the frame 50. This is accomplished by positioning beneath and in contact with each control rod 72 a support bar 80 as shown in FIG. 11. A support bar 80 is provided for each of the control rods 72. The ends of the support bars 80, are in turn, suitably connected to the frame 50. In this manner, the weight of the control rod 72 is removed from the mirror 44 and transferred to the support bar 80. With the rod end portions 76 adhesively connected to the mirror 44, the bars 80 serve to give vertical support to the mirror 44. As a result, the control rods 72 form the non-stretch, non-tension support for the mirror 44, as well as minimizing "hang tension".

As further illustrated in FIG. 11, the rods 72 are movable in the direction of the arrow 82 to in turn displace the surface of the mirror toward or away from the template 30. The rods 72 are freely movable on the support bars 80. The rods 72 are also movable in a second mode on the frame 50 by a power actuated mechanism 71, schematically illustrated in FIG. 17. The mechanism 71 includes hydraulically or electrically operable piston cylinder assemblies which include extensible portions connected to the respective control rod end portions 74. Linear induction motors, for example, can also be suitably linked to the control rods 72 to selectively move each control rod 72 toward or away from the flexible mirror to in turn deform the reflective surface of the mirror.

The power actuated mechanism 71 is connected through a controller 73 to a microprocessor 75 having an operator control 77. With this arrangement, selected areas of the mirror reflective surface are automatically deformed. The matrix position of the control rods 72 to be actuated is selected and their position corresponding to an alpha numeric code is inputed to the operator control 77. Corresponding electrical signals representative of the rod 72 to be removed and the degree and direction of movement are generated and imputed to the microprocessor 75. The microprocessor 75 is then actuated to process the incoming signals from control 77 and responsively transmit electrical signals to the controller 73 corresponding to the rods 72 to be removed and the direction and degree of movement. The controller 77 responsively actuates the respective power actuated control mechanism 71 to generate the desired movement of the rods 72.

Figure 17:
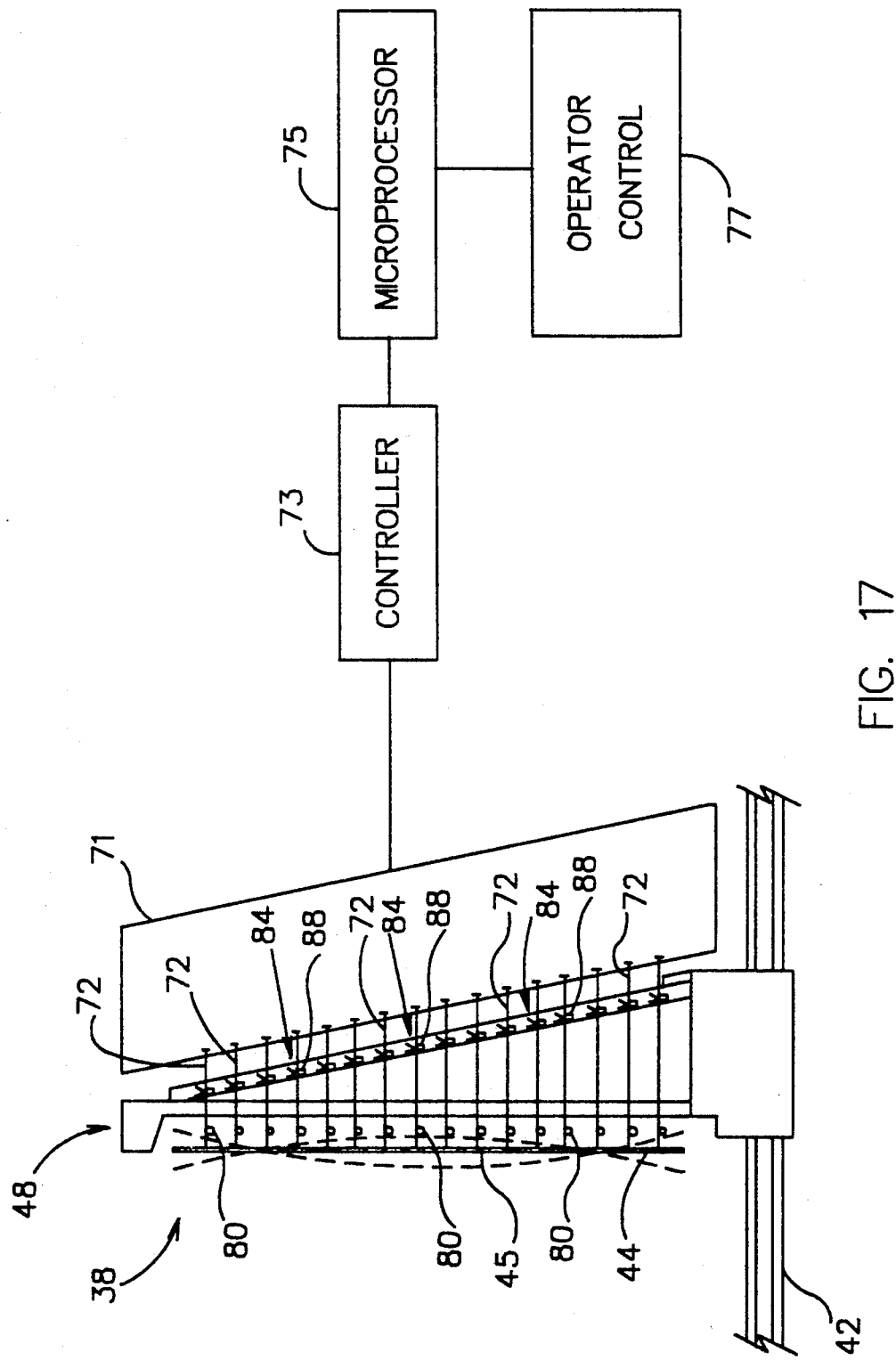
FIG. 17 is a diagrammatic illustration of apparatus for remote control of the reflector apparatus.

Once the rods 72 are advanced to a preselected position either to move the mirror toward the template 30 or away from the template 30, as shown in FIGS. 6 and 7, the final position of each rod 72 is fixed by a lock mechanism generally designated by the numeral 84. The lock mechanism 84 is also connected to the frame 50 and includes a combination wing nut and bolt 86 that extends into engagement with a block 88 carried by the frame 50. The bolt 86 also carries a washer 90 which is received by the control rod 72 which is also slidably supported by the block 88. By tightening the wing nut and bolt 86 into engagement with the block 88, the control rod is compressed between the washer 90 and the upper surface of the block 88 to prevent sliding movement of the rod 72 on the block 88. In this manner, the position of the rod 72 for a preselected distortion of the surface of the mirror 44 is maintained. The power actuated mechanism 71 shown in FIG. 17 is also operable to lock the position of the control rods 72 on the frame 50.

Figure 16:
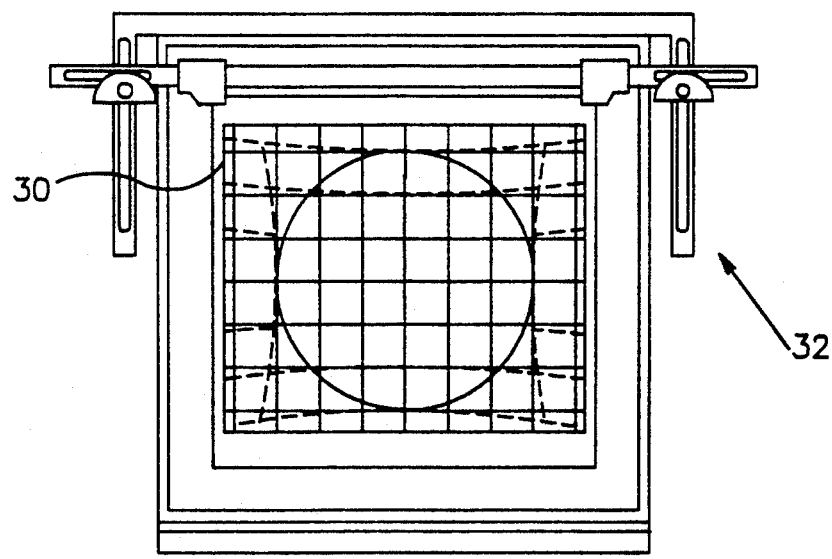
FIG. 16 is a front elevational view of the easel, illustrating distortion resulting in reflecting the image from the photograph onto the template and locking the controls to prevent interaction by additional counterdistortions to bring the reflected image into registry with the template.

By selectively locking the position of the control rods 72 distortion of desired areas of the reflective surface 45 of the mirror 44 is obtained. With this arrangement, the distorted position of the mirror is maintained, permitting a group of adjacent control rods to be manipulated to execute counterdistortion adjustments on a zoned portion of the reflected image. Also the movable rods 72 are manipulated using this zoning technique to isolate certain areas of the mirror from interaction by distortion of other segments of the mirror. Thus, the position of the mirror either in a distorted position or the initial planar position can be fixed by locking the rods 72 against longitudinal movement. Then other areas of the mirror can be distorted without effecting the areas where the rods are fixed in position. This permits efficient counterdistortions to be executed without having to continually make adjustments in the position of the mirror due to a prior executed adjustment in the position of the mirror. The feature of locking the control rods 72 in place, as illustrated for example in FIG. 16, can also be utilized to bring the entire surface 45 of the mirror into vertical alignment where a surface imperfection may exist in the plane of the mirror.

Figure 12:
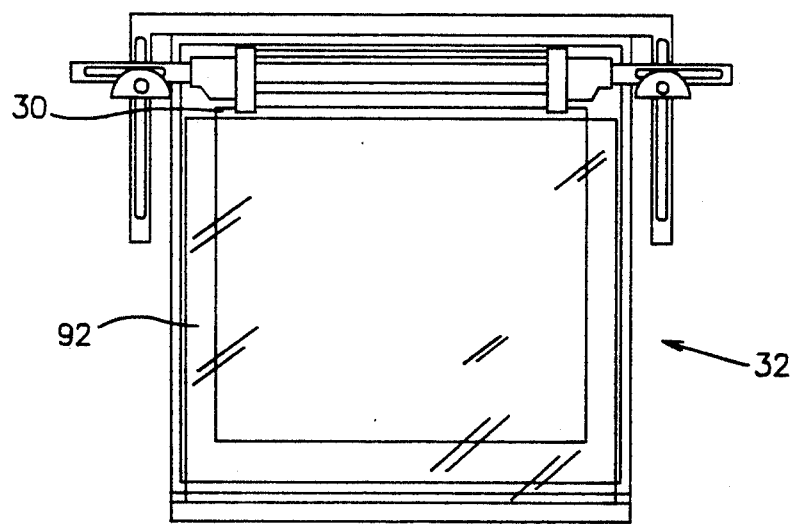
FIG. 12 is a schematic illustration of the front of the easel, illustrating placement of the orthofilm in the easel when the projected image and template are in register.

Now referring to FIG. 12 there is illustrated the front of the easel 32 facing the mirror 44 with an orthofilm 92 positioned in overlying relation with template 30 after the desired landmark features of the reflected image have been brought into register with the corresponding landmark features on the template 30. The orthofilm 92 is positioned on the template 30 with the photosensitive emulsion side up. To convert the resultant photo for use with selected types of reproduction machines, a orthoscreen is then placed on the orthofilm and both the film and screen are held in place on the easel, with their emulsion sides together to get a sharp picture. This is why the template is made in the reverse mode. Where a continuous emulsion type photograph on photographic paper is the final production goal, the template is made right side up instead of reverse side up. Although screening can be done, it is not necessary unless the final in-scale photomap is to be used as the base for printing press type reproduction.

Figure 13:
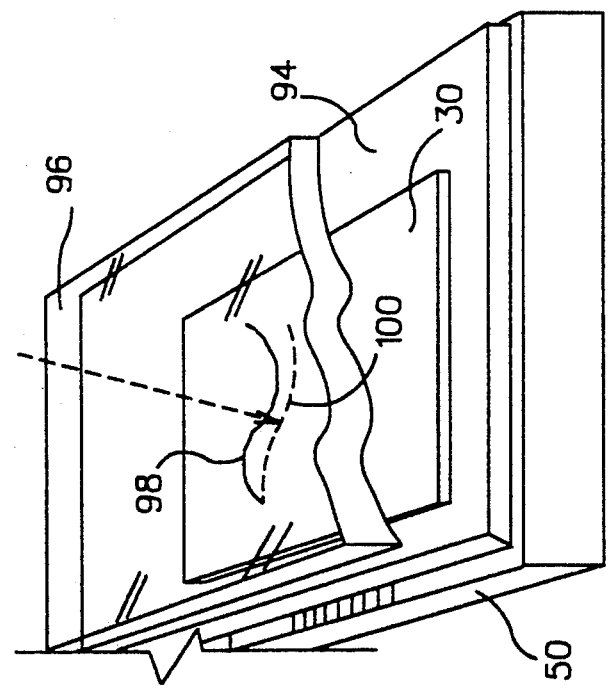
FIG. 13 is an enlarged fragmentary, isometric view of the respective materials mounted on the easel, illustrating the projected image by the dotted line and the corresponding landmark on the template indicated by the solid line.

Now referring to FIG. 13 there is illustrated in detail the material mounted on the easel for effecting the counterdistorted reflected image on the template 30. The template 30 is supported by a pad 94 on the easel frame 50. Then to hold the template 30 in place on the pad 94, a glass plate 96 supported by the easel frame 50 is positioned over the template 30. Preferably the glass plate 96 is pivotally connected to the easel 32 to close down over the template and obtain the desired compression of the template 30 on the pad 94.

A representative landmark feature on the template 30 is indicated by the solid line 98 and the corresponding feature reflected by the mirror is represented by the dotted line 100. The reflected feature is displaced from the corresponding feature on the template. By manipulating the mirror 44 the reflected feature 100 is brought into register with corresponding feature 98 on the template 30. Also the zoning technique, above-described, can be employed to lock a selected control rod or group of control rods without deforming the mirror to hold the mirror steady for small or large areas of the mirror. Thus, any section of the mirror can be deformed without affecting any other area of the mirror.

Figure 14:
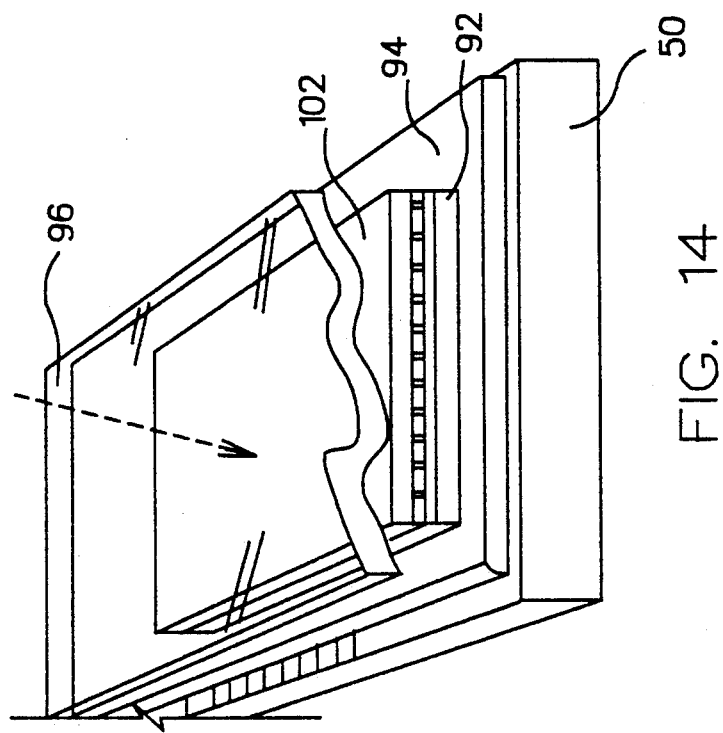
FIG. 14 is a view similar to FIG. 13, illustrating the film with the positive, light sensitive emulsion side up.
Figure 15:
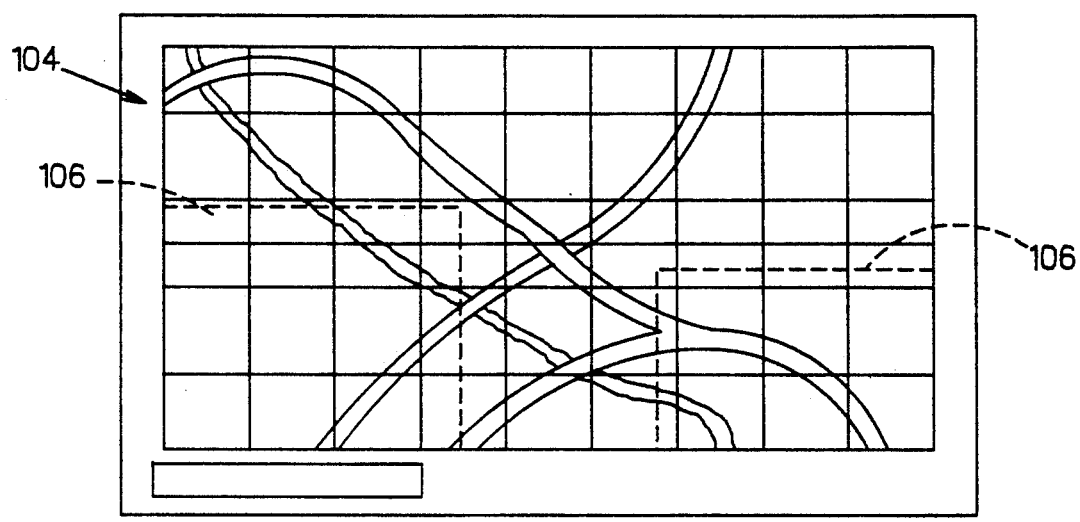
FIG. 15 is a schematic illustration of an assembled in-scale aerial photomap prepared from individual segments of in-scale photomaps produced in accordance with the present invention.

Once the required adjustments have been made to the reflected image, the template is removed from the easel and the photographic film is positioned on the easel. As illustrated in FIG. 14 a sheet of orthofilm 92 is positioned on the pad 94 with the photosensitive emulsion side up. An orthoscreen 102 is positioned on top of the emulsion side of the film 92. The glass plate 96 is then positioned over the screen 102 to hold the screen and film in place on the easel. The screen is then exposed to the project image which has been adjusted to remove the distortions. The film 92 is exposed through the screen 102 to provide a screen ortho-positive transparency. Upon completion of exposure, the film is developed to provide the desired in-scale aerial photograph as an orthopositive screened transparency or tracing. As shown in FIG. 15, an assembled in-scale aerial photograph generally designated by the numeral 104 is prepared from a plurality of individual segments 106 of in-scale photographs prepared in accordance with the present invention. It also should be understood that photograph 104 can be prepared in a singular manner as well as a mosaic made up of many segments.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for reflecting the image of an aerial survey photograph onto a template containing landmark features appearing on the aerial survey photograph comprising, a frame constructed of a pair of spaced apart upright members connected to a pair of cross-members to form an opening in said frame, a flexible planar sheet of material having a reflecting surface and an opposite surface, a plurality of control rods supported by said frame in a preselected array, means for supporting said planar sheet by said control rods to support and to move said planar sheet free of induced tension, said control rods each having an end portion maintained in contact with said planar sheet opposite surface for selectively deforming said reflecting surface upon movement of said control rod toward and away from said planar sheet to place the reflected image of landmark features on the aerial survey photograph into register with the corresponding landmark features on the template, and means for relieving tension induced in said planar sheet such that said planar sheet is maintained free of induced tension added to said planar sheet upon displacement of said reflective surface during movement of said control rods.

2. Apparatus as set forth in claim 1 which includes, means for releasing tension induced in said planar sheet as said reflecting surfaces is deformed.

3. Apparatus as set forth in claim 1 which includes, means for selectively deforming said planar sheet reflecting surface.

4. Apparatus as set forth in claim 3 which includes, control means connected to said planar sheet for vertically supporting said reflecting surface free of tension.

5. Apparatus as set forth in claim 1 which includes, means for locking selected ones of said control rods to prevent deformation of selected areas of said reflecting surface.

6. Apparatus as set forth in claim 5 which includes, means for holding steady a section of said reflective surface without deforming said reflective surface.

7. Apparatus as set forth in claim 1 which includes, said control rods being arranged in a grid pattern permitting identification of the location of deformations in said reflecting surface by a coordinate-scale system.

8. A method for reflecting the image of an aerial survey photograph onto a template having landmark features in correct relative locations thereon comprising the steps of, positioning a reflective free of tension mirror in the opening of a frame with the reflective surface of the mirror located to receive the projected image and reflect the image onto the template, flexibly positioning the reflective mirror within the frame to support the mirror free of induced tension and to allow a release of induced tension applied to the reflective surface, displacing a selected point in the plane of the reflective mirror by moving the plane of the mirror toward or away from the template to bring a reflected landmark feature of the image into register with the corresponding landmark feature on the template, and releasing induced tension added to the plane of the reflective mirror upon displacement thereof to maintain the mirror positioned within the frame free of induced tension and permit movement of the image of a selected landmark feature into register with the correct relative location of the landmark feature on the template while maintaining stationary the position of other reflective images on the template.

9. A method as set forth in claim 8 which includes, isolating a selected area of the mirror from deformation while another selected area of the mirror is being deformed.

10. A method as set forth in claim 8 which includes, preventing deformation of a zone of the mirror.

11. A method as set forth in claim 8 which includes, preventing deformation of a section of the mirror while deforming an adjacent section of the mirror.

12. A method as set forth in claim 8 which includes, connecting controls to the mirror permitting displacement of the plane of the mirror forward and backward.

13. A method as set forth in claim 12 which includes, locking the controls in a pattern defined by a coordinate system.

14. A method of making in-scale aerial survey photomaps of a geographic area comprising the steps of, projecting an image of an out-of-scale aerial survey photograph of a geographic area onto a reflective surface free of induced tension, maintaining the reflective surface free of induced tension, mounting a template containing key landmark features appearing on the aerial survey photograph at a given scale opposite the reflective surface, reflecting the image onto the template to superimpose the image on the template, displaying a selected point in the plane of the reflective surface in a selected direction toward or away from the template to bring a landmark feature of the image into register with the corresponding landmark feature of the template, fixing the registered position of the displaced point in the plane of the reflective surface to prevent movement of the portion of the reflective surface containing the displaced point, while making and fixing a plurality of successive displacements in other portions of the plane of the reflective surface to bring the remaining images of the landmark features into register with corresponding features on the template, without displacing the fixed position of the prior registered positions, thereafter positioning an unexposed photographic film at the location of the template, resuming the projection of the registered image onto the film to expose the film, and processing the exposed film to produce an in-scale aerial survey photograph of the photographic area.

15. A method as set forth in claim 14 which includes, maintaining the reflective surface free of induced tension as the reflective surface is deformed to counterdistort projected photographic distortions to make the projected image register with the selected counterpart of the image on the template.

16. A method as set forth in claim 14 which includes, maintaining a sector of the reflective surface defining a zone rigid while displacing a selected area of the reflective surface adjacent the sector maintained rigid to bring the reflected image of the selected area into register with the corresponding features on the template.

17. A method as set forth in claim 14 which includes, connecting controls to the reflective surface in a grid pattern and moving the reflective surface in a preselected pattern identified by the grid.

18. A method as set forth in claim 14 which includes, displacing the reflective surface in a horizontal plane while vertically supporting the reflective surface.

19. A method as set forth in claim 14 which includes, maintaining a section of the plane of the reflective surface fixed while moving other sections of the plane of the reflective surface.

20. A method as set forth in claim 14 which includes, minimizing distortion as the registered image is projected on the film and the film is exposed.

* * * * *